United States Patent [19]

Borman et al.

[11] Patent Number: 5,453,479
[45] Date of Patent: Sep. 26, 1995

[54] POLYESTERIFICATION CATALYST

[75] Inventors: Willem F. H. Borman; Thomas G. Shannon, both of Evansville, Ind.

[73] Assignee: General Electric Company, Pittsfield, Mass.

[21] Appl. No.: 90,607

[22] Filed: Jul. 12, 1993

[51] Int. Cl.[6] ................................................. C08G 63/82
[52] U.S. Cl. .................. 528/279; 528/272; 528/286; 528/308.6; 525/439
[58] Field of Search ..................................... 528/272, 279, 528/286, 308.6; 525/439

[56] References Cited

U.S. PATENT DOCUMENTS

| 3,965,071 | 6/1976 | McClelland | 528/279 |
|---|---|---|---|
| 4,031,165 | 6/1977 | Saiki et al. | 525/444 |
| 4,115,371 | 9/1978 | Bier et al. | 528/279 |
| 4,208,527 | 6/1980 | Horlbeck et al. | 528/279 |
| 4,452,969 | 6/1984 | McCready | 528/279 |
| 4,452,970 | 6/1984 | Brunelle | 528/279 |
| 4,482,700 | 11/1984 | Kuhnrich et al. | 528/279 |
| 4,532,290 | 7/1985 | Jacquiss et al. | 524/417 |
| 4,600,789 | 7/1986 | Sugerman et al. | 556/17 |
| 4,623,738 | 11/1986 | Sugerman et al. | 556/17 |
| 4,657,988 | 4/1987 | Sugerman et al. | 525/437 |

*Primary Examiner*—Samuel A. Acquah

[57] ABSTRACT

Novel polyesterification catalysts comprising a phosphorus component and a titanium component are disclosed which are useful in preparing improved blends of polyester and polycarbonate resins.

20 Claims, No Drawings

POLYESTERIFICATION CATALYST

The present invention relates to a novel polyesterification catalyst system. More particularly, the present invention relates to a polyesterification catalyst system comprising a phosphorus component and a titanium compound. Most particularly, the present invention relates to a polyesterification catalyst system comprising a complex of a phosphorus compound and a titanium compound; and to blends of polyesters prepared with these catalysts with polycarbonate resins.

BACKGROUND OF THE PRESENT INVENTION

Polyesters, such as poly(ethylene terephthalate) or PET, and poly(butylene terephthalate) or PBT, are widely used in the preparation of articles by forming methods such as injection molding and tube extrusion. Many of their properties, including chemical stability, solvent resistance and low permeability to gases, make them attractive candidates for such forming operations as blow molding, profile extrusion and thermoforming.

It is also well known in the art to blend polyesters with other resins to provide other useful properties. Polybutylene terephthalate is commercially blended with aromatic polycarbonates and other ingredients, such as rubbers, for applications requiring high toughness and ductility, combined with resistance to deformation under load at elevated temperatures.

However, it has been found that during the preparation of the polyesters or during the processing of blends of polyesters and polycarbonates at the required high temperatures, chemical interactions, such as ester-carbonate interchange reactions, occur resulting in reduced strength and increased mold cycle times. These chemical interactions are promoted by the activity of the residual titanium ester-based polyesterification catalyst employed during the synthesis of the polyester.

Previous attempts in the prior to overcome these shortcomings have included employing chelate catalysts during the preparation of the polyesters.

For example, McCready, U.S. Pat. No. 4,452,969 teaches using a titanium-containing chelate prepared by the reaction of a tetraalkyl titanate with a substituted carboxylic acid derivative such as methyl salicylate, malic acid, glycine or dibutyl tartrate. Similarly, Brunelle, U.S. Pat. No. 4,452,970 teaches employing a titanium-containing chelate catalyst prepared by reacting a tetraalkyl titanate with an ortho-substituted hydroxyaromatic compound.

Other attempts in the prior art have included adding stabilizers after the esterification reaction stages. For example, Saiki et al., U.S. Pat. No. 4,031,165 teaches employing a titanium catalyst to prepare an aliphatic polyester/aromatic polyester block copolymer and then adding certain phosphorus compound deactivators to prevent random copolymerization.

Bier et al., U.S. Pat. No. 4,115,371; and Horlbeck et al., U.S. Pat. No. 4,208,527 teach reducing the discoloration in polyesters by employing phosphorus containing deactivators after esterification.

Kühnrich et al., U.S. Pat. No. 4,482,700 teaches preparing polyesters with the use of titanium catalyst and adjuvants prepared from phosphorous acid and monoepoxides to produce polyesters free from discoloration.

Mention is also made of the Sugerman et al. patents, U.S. Pat. Nos. 4,600,789, 4,623,738 and 4,657,988 which teach the use of neoalkoxy organotitanate compounds as coupling agents and repolymerization agents.

While satisfactory results have been achieved with catalyst inactivators, such an additional process step is costly and inefficient from a processing standpoint. It would therefore represent a notable advance in the state of the art if a catalyst could be developed which eliminated this extra additive step.

It has now been found that such a long felt need in the art is satisfied by the polyesterification catalyst systems of the present invention. Unexpectedly, these novel catalysts are capable of catalyzing the polyesterification reaction between the dicarboxylic acid, and/or derivatives thereof, and the glycol, but do not catalyze the interchange reaction between aromatic esters and carbonates.

SUMMARY OF THE PRESENT INVENTION

According to the present invention there is provided a novel polyesterification catalyst system comprising a phosphorus component and a titanium component. Preferably, the catalyst is a complex of a phosphorus compound and a titanium compound in a molar ratio of less than about 3:1, more preferably less than about 2:1. Preferred phosphorus compounds are phosphorous acid, diphenylphosphite, phenylphosphinic acid, dibutyl phosphite, diisopropyl phosphite, diphenyl decyl phosphite, sodium dihydrogen phosphate or mixtures of any of the foregoing. Preferred titanium compounds are tetraisopropyl titanate, tetra-w-ethylhexyl titanate, tetra butyl titanate or mixtures thereof.

Also according to the present invention there is provided a method for preparing a polyester/polycarbonate blend comprising preparing a polyester with a polyesterification catalyst system comprising a phosphorus component and a titanium component and then blending the polyester with a polycarbonate.

Still further, the present invention provides a method for preparing a polyester comprising reacting a diol and a dicarboxylic acid in the presence of a polyesterification catalyst system comprising a phosphorus component and a titanium component.

DETAILED DESCRIPTION OF THE PRESENT INVENTION

The polyesters suitable for use herein are generally those which are derived from an aliphatic, aliphatic ether or cycloaliphatic diol, or mixtures thereof, preferably containing from about 2 to about 10 carbon atoms, and one or more aromatic or cycloaliphatic dicarboxylic acids. Preferred polyesters are derived from an aliphatic diol and an aromatic dicarboxylic acid having repeating units of the following general formula

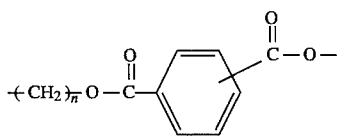

wherein n is an integer of from 2 to 10, preferably 2 to 4. The most preferred polyesters are poly(ethylene terephthalate) and poly(butylene terephthalate); most preferably poly(1,4-butylene terephthalate).

Also contemplated herein are the above polyesters with additional amounts of polyols and/or acids in amounts of from about 0.5 to about 50 weight percent based on the weight of the total composition. The acids can be aliphatic or cycloaliphatic with the number of carbon atoms ranging from 2 to 20. Likewise, the glycols can be cycloaliphatic or aliphatic with the number of carbon atoms covering the same range. Polyalkylene ether glycols can also be used where the entire glycol portion varies in molecular weight from 100 to 10,000. All such polyesters can be made following the teachings of, for example, U.S. Pat. Nos. 2,465,319; and 3,047,539.

Also useful are the polyesters which are derived from a cycloaliphatic diol and an aromatic dicarboxylic acid. These are prepared, for example, by condensing either the cis- or trans-isomer (or mixtures thereof), for example, 1,4-(cyclohexanedimethanol), with an aromatic dicarboxylic acid so as to produce a polyester having recurring units of the following formula:

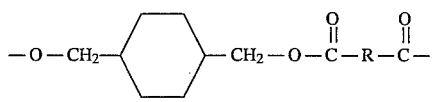

wherein the cyclohexane ring is selected from the cis- and trans-isomers thereof and R represents an aryl or cycloaliphatic radical containing from 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(pcarboxyphenyl)ethane, 4,4'-dicarboxydiphenyl ether, etc., and mixtures of these. Acids containing fused rings can also be present, such as in 1,4- or 1,5-naphthalene dicarboxylic acids. Also contemplated are cycloaliphatic diacids, such as cyclohexane dicarboxylic acid. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

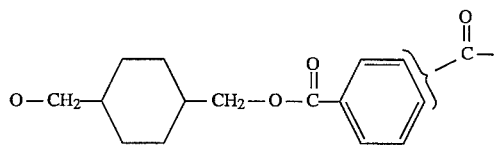

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane dimethanol and an alkylene glycol with an aromatic dicarboxylic acid so as to produce a copolyester having units of the following formulae:

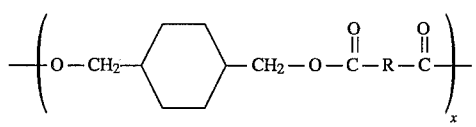

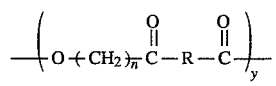

wherein the cyclohexane ring is selected from the cis- and trans-isomers thereof, R is as previously defined, n is an integer of 2 to 10, the x units comprise from about 1 to about 99 percent by weight, and the y units comprise from about 99 to about 1 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 80:20:100. These copolyesters have repeating units of the following formulae:

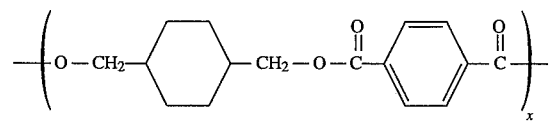

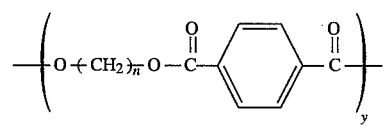

wherein x and y are as previously defined.

The polyesters employed in the practice of this invention will usually have an intrinsic viscosity of from about 0.4 to about 2.0 dl/g, as measured in a 60:40 phenol:tetrachloroethane mixture, or similar solvent at 20–30° C.

A preferred polyalkylene arylate useful in the practice of the present invention is a poly(1,4-butylene terephthalate) having an intrinsic viscosity of at least about 0.5 dl/g. Other useful polyesters are polyethylene terephthalate or poly(1,4-cyclohexanedimethanol terephthalate) having an intrinsic viscosity of at least about 0.5 dl/g.

Critical to the present invention is that the polyesters of the present invention are prepared by an esterification reaction in the presence of the catalyst systems of the present invention. The catalyst systems of the present invention useful in preparing the polyesters of the present invention comprise both a phosphorus component and a titanium component. These catalysts are generally in the form of a complex of a phosphorus compound and a titanium compound. Preferably, the molar ratio of the phosphorus compound to the titanium compound is less than about 3:1, more preferably less than about 2:1, and may also be less than about 1:1.

Preferred phosphorus compounds include, but are not limited to, phosphates, phosphites, phosphorous acids or phosphinic acids such as phosphorous acid, diphenylphosphite, phenylphosphinic acid, dibutyl phosphite, diisopropyl phosphite, diphenyl decyl phosphite, sodium dihydrogen phosphate, and mixtures of any of the foregoing. These compounds are prepared according to methods known to those skilled in the art or are commercially available from a variety of sources.

Preferred titanium compounds comprise alkyl titanium esters, such as are known to those skilled in the art, including tetraisopropyl titanate, tetra-w-ethylhexyl titanate, tetra butyl titanate or mixtures thereof. These compounds are prepared according to methods known to those skilled in the art or are commercially available from a variety of sources.

The phosphorus-containing titanium catalysts of the present invention are generally prepared by mixing the titanium compound with the phosphorus compound to form a complex, or the components may be separately added to the reactor.

The amount of catalyst used in the esterification reaction generally ranges from about 0.005 to about 0.2 percent by weight, based on the amount of acid or ester. In the method of preparing the polyesters of the present invention, typically the diol, dicarboxylic acid and catalyst of the present invention are heated to from about 180° to about 300° C. to effect the esterification reaction. Such esterification conditions are known to those of ordinary skill in the art.

In preferred embodiments of the present invention, the polyesters are then blended with a polycarbonate resin. Polycarbonate resins useful in preparing the blends of the present invention are generally aromatic polycarbonate resins. Typically these are prepared by reacting a dihydric phenol with a carbonate precursor, such as phosgene, a haloformate or a carbonate ester. Generally speaking, such carbonate polymers may be typified as possessing recurring structural units of the formula

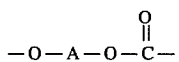

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4 -hydroxyphenyl) pentane; 2,4' -(dihydroxydiphenyl) methane; bis(2 hydroxyphenyl) methane; bis(4 -hydroxyphenyl) methane; bis(4-hydroxy-5-nitrophenyl) methane; 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dimethyl-4-hydroxyphenyl)propane; 2,4' -dihydroxydiphenyl sulfone; 5'-chloro-2,4'-dihydroxydiphenyl sulfone; bis-(4hydroxyphenyl)diphenyl sulfone; 4,4' -dihydroxydiphenyl ether; 4,4' -dihydroxy-3,3' -dichlorodiphenyl ether; 4,4 -dihydroxy-2,5-dihydroxydiphenyl ether; and the like.

Other dihydric phenols which are also suitable for use in the preparation of the above polycarbonates are disclosed in U.S. Pat Nos. 2,999,835; 3,038,365; 3,334,154; and 4,131, 575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl)propane (bisphenol-A), commercially available under the trade designation LEXAN® from General Electric Company.

Typically the blends of polyester and polycarbonate will contain from about 1 to about 99 parts by weight of polycarbonate and from about 99 to about 1 parts by weight of polyester. In preferred embodiments, the amount of polycarbonate in the blends will range from about 5 to about 95, more preferably from about 15 to about 85, and most preferably from about 40 to about 60 parts by weight. Correspondingly, the amount of polyester will range from about 95 to about 5, more preferably from about 85 to about 15, and most preferably from about 60 to about 40 parts by weight.

The polyester resins of the present invention, optionally blended with a polycarbonate resin, can be further combined with any of the conventional additives, including, but not limited to, reinforcing agents, antioxidants, flow promoters, pigments, impact modifiers, flame retardants, drip retardants and the like in desired amounts.

Reinforcing agents useful in the practice of the present invention are typically selected from glass flakes, glass beads, glass fibers, polymeric fibers and combinations thereof, or mineral reinforcements, such as talc, mica, Wollastonite, mixtures of any of the foregoing and the like.

The resins and other ingredients are conveniently blended together by methods well known to those skilled in the art. The blend consisting of the polyester resin, the polycarbonate resin and any of the other additives or modifiers are fed into an extruder at a temperature of from about 480° to about 550° F. The extrudate is then comminuted into pellets or other suitable shapes. This mixture is then fed into a conventional molding machine, such as an injection molder, to provide novel articles comprising the compositions of the present invention. The molding temperature may be from about 500° to about 580° F., with the mold temperature being from about 100° to about 250° F.

DESCRIPTION OF THE PREFERRED EMBODIMENTS

The following examples illustrate the present invention. They are not to be construed to limit the scope of the appended claims in any manner whatsoever.

EXAMPLES 1–5

97 g dimethyl terephthalate and 75 ml 1,4-butanediol are reacted in a 1-liter glass reactor, equipped with a stirrer and distillation take-off condenser and trap, in the presence of various catalysts. Initially, the reaction temperature was 150°–175° C. for 0.5–1 hour, followed by polyesterification at increasing temperatures up to 250°–260° C. and a pressure down to 0.15– 0.25 mm Hg for 1–4 hours. The results, along with catalyst compositions are set forth below in Table 1.

TABLE 1

| Example | 1 | 2 | 3 | 4 | 5 |
|---|---|---|---|---|---|
| Catalyst, mg | | | | | |
| Di(dioctyl)phosphato-tetraisopropyl titanate[a] | 50 | — | — | — | — |
| Titanium IV, bis(dioctyl)-phosphate-O ethylene diolato[b] | — | 50 | — | — | — |
| 1:2 mole ratio of tetraisopropyl titanate (TPT) and diphenyl decyl phosphite[c] | — | — | 175 | — | — |
| 1:4 mole ratio of TPT and diphenyl decyl phosphite | — | — | — | 300 | — |
| 1:2 mole ratio of TPT and phenyl phosphinic acid | — | — | — | — | 600 |
| Properties | | | | | |
| Melt viscosity, poise[d] | 2600 | — | 4600 | 2000 | — |
| Remarks | A | B | A | C | A |

[a] = Kenrich KR41B, Kenrich Petrochemicals, Inc.
[b] = Kenrich KR212, Kenrich Petrochemicals, Inc.
[c] = Ferro 904, Ferro, Inc.
[d] = at 250° C.
A = White polymer
B = No reaction
C = Slow, white product The data in Table 1 shows that the catalysts of the present invention, Examples 3, 4 and 5, are effective esterification catalysts.

EXAMPLES 6–9

The procedure of Examples 1–5 is repeated except varying the polymerization time and molar ratio of catalyst components. The results are set forth below in Table 2.

TABLE 1

| Example | 6A* | 6 | 7 | 8 | 9 |
|---|---|---|---|---|---|
| Catalyst, ppm[a] | | | | | |
| Tetraisopropyl titanate | 90 | — | — | — | — |
| 1:2 mole ratio of tetraisopropyl titanate/di-isopropyl phosphite | — | 90 | — | — | — |
| 1:2.5 mole ratio of tetraisopropyl titanate/di-isopropyl phosphite | — | — | 90 | — | — |
| 1:3 mole ratio of tetraisopropyl titanate/di-isopropyl phosphite | — | — | — | 90 | — |
| Di(Dioctyl) phosphato-tetraisopropyl titanate[b] | — | — | — | — | 90 |
| Properties | | | | | |
| Polymerization Time, min | 100 | 130 | 165 | 220 | 110 |
| Melt viscosity, poise[c] | 16900 | 19000 | 16500 | 3200 | 14000 |

* = Comparative Example
[a] = Concentration expressed as ppm titanium in final polymer product
[b] = Kenrich Petrochemical, Inc.
[c] = Measured at 250° C., 21,600 gram weight, 5 minute preheat time, 0.615" (length) × 0.042 diameter) orifice, Tinius Olsen melt plastometer From Table 2 above, it can be seen that at same levels of catalyst, high viscosity resins can be produced with the catalysts of the present invention.

EXAMPLES 10–14

Samples of the polyester (PBT) products from Examples 6–9 are powdered. The powdered products were then mixed with bisphenol A polycarbonate (PC) powder in a 0.85:1.0 weight ratio. The PBT/PC blends are then placed in a Monsanto Melt Rheometer and heated for 5 minutes at 300° C. After heating, the material is rapidly extruded and a portion of the extrudate is analyzed with a differential scanning calorimeter (DSC), according to the following mildly abusive DSC program.

| Initial Temp. | Final Temp. | Rate | Hold Time | Notes |
|---|---|---|---|---|
| 40°C. | 260°C. | 20° C./min | N/A | 1st Heat |
| 260° C. | 260° C. | 0° C./min | 20 minutes | |
| 260° C. | 200° C. | 20° C./min | N/A | |
| 200° C. | 200° C. | 0° C./min | 10 minutes | |
| 200° C. | 260° C. | 20° C./min | N/A | 2nd Heat |

The PBT melting point is measured. The greater the melting point from first heat to second heat the more extensive the level of polycarbonate/polyester exchange. The results are set forth in Table 3 Below.

TABLE 3

| Example | 10A* | 10 | 11 | 12 | 13 | 14 |
|---|---|---|---|---|---|---|
| Polyester | A | B | C | D | E | F |
| Physical Properties Melting Point, °C. | | | | | | |
| First Heat | 227 | 227 | 228 | 226 | 221 | 227 |
| Second Heat | 203 | 218 | 224 | 224 | 214 | 211 |
| Delta T | 24 | 9 | 4 | 2 | 7 | 16 |

* = Comparative Example
A = Example 6A*
B = Example 6
C = Example 7
D = Example 8
E = Example 9
F = PBT made with 1:1 TPT/di-isopropyl phosphite catalyst at 90 ppm Ti level The data in Table 3 shows that the polyester/polycarbonate blends prepared in accordance with the present invention provide significant improvments in reduced ester-carbonate interchange over blends prepared with polyesters produced with the prior art catalysts.

EXAMPLES 15–26

The ester/carbonate exchange reaction in polyester polycarbonate resin blends is modeled by the reaction between diphenyl carbonate (DPC) and bis butylene benzoate. The ratio of phenyl benzoate to DPC is used to determine the extent of the reaction and measured by vapor phase chromatography using a 5% OV-101 on 80/100 mesh W.HP. 10' column. The experimental procedure is as follows:

1.1 grams of DPC (5 mmoles) and 1.5 grams of butylene bisbenzoate (5 mmoles) are mixed in a large test tube and heated to 250° C. and shaken well to obtain a homogeneous solution. After the mixtures are completely melted, catalyst solution (generally in methylene chloride) was added via a syringe. The solutions are shaken regularly and small aliquots are removed at 10, 20 and 30 minutes reaction times. Aliquots are diluted with $CH_2Cl_2$ and analyzed by vapor phase chromatography. An amount of catalyst solution is chosen so that $5\times10^{-3}$ mmoles Ti is used unless otherwise noted.

The phosphorus/titanium catalyst solutions are prepared by mixing tetraisopropyl or tetraethylhexyl titanate with the corresponding phosphorus compound and then diluting with $CH_2Cl_2$.

The results are set forth in Table 4 below.

TABLE 4

| Example | 15A* | 15B* | 15 | 16 | 17 | 18 | 19 | 20 | 21 | 22 | 23 | 24 | 25 | 26 | 26A* |
|---|---|---|---|---|---|---|---|---|---|---|---|---|---|---|---|
| Catalyst | | | | | | | | | | | | | | | |
| Tetraisopropyl titanate (TPT) | X | — | — | — | — | — | — | — | — | — | — | — | — | — | — |
| Tetra-2-ethylhexyl titanate (TOT) | — | X | — | — | — | — | — | — | — | — | — | — | — | — | — |
| 2 eq. diphenylphosphite + TPT | — | — | X | — | — | — | — | — | — | — | — | — | — | — | — |
| 2 eq. phenylphosphinic acid + TPT | — | — | — | X | — | — | — | — | — | — | — | — | — | — | — |
| 2 eq. dibutyl phosphite + TPT | — | — | — | — | X | — | — | — | — | — | — | — | — | — | — |
| 2 eq. diisopropyl phosphite + TPT | — | — | — | — | — | X | — | — | — | — | — | — | — | — | — |
| 2 eq. diphenyl decyl phosphite + TPT | — | — | — | — | — | — | X | — | — | — | — | — | — | — | — |
| TOT + 100 mg sodium dihydrogen phosphate | — | — | — | — | — | — | — | X | — | — | — | — | — | — | — |
| TOT + 100 mg phosphorous acid | — | — | — | — | — | — | — | — | X | — | — | — | — | — | — |
| 1 eq. Diphenylphosphite + TPT | — | — | — | — | — | — | — | — | — | X | — | — | — | — | — |
| 1 eq. phenylphosphinic acid + TPT | — | — | — | — | — | — | — | — | — | — | X | — | — | — | — |
| 1 eq. dibutyl phosphite + TPT | — | — | — | — | — | — | — | — | — | — | — | X | — | — | — |
| 1 eq. diisopropyl phosphite + TPT | — | — | — | — | — | — | — | — | — | — | — | — | X | — | — |
| 1 eq. diphenyl decyl phosphite + TPT | — | — | — | — | — | — | — | — | — | — | — | — | — | X | — |
| TOT + 10 mg sodium dihydrogen phosphate | — | — | — | — | — | — | — | — | — | — | — | — | — | — | X |
| Properties | | | | | | | | | | | | | | | |
| Phenyl benzoate: DPC ratio | 1.71 | 2.48 | 0.00 | 0.00 | 0.00 | 0.00 | 0.00 | 0.08 | 0.03 | 0.00 | 0.38 | 0.00 | 0.00 | 0.26 | 1.79 |

\* = Comparative example

Complexes of phosphite and titanium having molar ratios of 1:1 and 2:1 are found to be effective in preventing ester carbonate interchange.

All of the above-referenced patents are hereby incorporated by reference.

Many variations of the present invention will suggest themselves to those skilled in the art in light of the above-detailed description. A wide variety of other phosphorus compounds, such as other alkyl titanium esters, may be employed in the catalyst systems of the present invention. Similarly, other phosphorus compounds, such as, for example, phosphorous acid, may be employed in the catalysts of the present invention. The catalysts may be employed in the production of any of the known polyesters, including, but not limited to polyethylene terephthalate and poly(1,4-butylene terephthalate). Further, blends of the polyesters of the present invention with other thermoplastic resins such as polycarbonates, may further include conventional additives. All such obvious modifications are within the full intended scope of the appended claims.

We claim:

1. A method for preparing a polyester comprising reacting a diol and a dicarboxylic acid in the presence of a polyesterification catalyst system consisting essentially of a phosphorus component and a titanium component.

2. A method as defined in claim 1 wherein said diol comprises butylene glycol and said dicarboxylic acid or derivative thereof comprises terephthalic acid.

3. A method as defined in claim 1 wherein said polyesterification catalyst system comprises a complex of a phosphorus compound and a titanium compound in a molar ratio of less than about 3:1 phosphorus compound:titanium compound.

4. A method for preparing a polyester comprising reacting a diol and a dicarboxylic acid, or derivative thereof, in the presence of a polyesterification catalyst system consisting of a phosphorus component and a titanium component.

5. The method of claim 3, wherein said complex has a molar ratio of less than about 2:1 phosphorus compound:titanium compound.

6. The method of claim 5, wherein said complex has a molar ratio of less than about 1:1 phosphorus compound:titanium compound.

7. The method of claim 4, wherein said complex has a molar ratio of less than about 3:1 phosphorus compound:titanium compound.

8. The method of claim 7, wherein said complex has a molar ratio of less than about 2:1 phosphorus compound:titanium compound.

9. The method of claim 8, wherein said complex has a molar ratio of less than about 1:1 phosphorus compound:titanium compound.

10. The method of claim 3, wherein said phosphorus compound is selected from the group consisting of a phosphate, a phosphite, a phosphorous acid, a phosphinic acid, and mixtures thereof.

11. The method of claim 10, wherein said phosphorus compound is selected from the group consisting of diphenylphosphite, phenylphosphinic acid, dibutyl phosphite, diisopropyl phosphite, diphenyl decyl phosphite, sodium hydrogen phosphate, and mixtures thereof.

12. The method of claim 7, wherein said phosphorus compound is selected from the group consisting of a phosphate, a phosphite, a phosphorous acid, a phosphinic acid, and mixtures thereof.

13. The method of claim 12, wherein said phosphorus compound is selected from the group consisting of diphenylphosphite, phenylphosphinic acid, dibutyl phosphite, diisopropyl phosphite, diphenyl decyl phosphite, sodium hydrogen phosphate, and mixtures thereof.

14. The method of claim 3, wherein said titanium compound is a titanium ester.

15. The method of claim 14, wherein said titanium ester is selected from the group consisting of tetraisopropyl titanate, tetra butyl titanate and tetra-w-ethylhexyl titanate.

16. The method of claim 7, wherein said titanium compound is a titanium ester.

17. The method of claim 16, wherein said titanium ester is selected from the group consisting of tetraisopropyl titanate, tetra butyl titanate or tetra-w-ethylhexyl titanate.

18. A method for preparing a polyester comprising reacting a diol and a dicarboxylic acid in the presence of a polyesterification catalyst system comprising (1) a phosphorus compound selected from the group consisting of a phosphate, a phosphite, a phosphinic acid, and mixtures thereof, and (2) a titanium catalyst.

19. The method of claim 18, wherein said phosphorus compound is selected from the group consisting of diphenylphosphite, phenylphosphinic acid, dibutyl phosphite, diisopropyl phosphite, diphenyl decyl phosphite, sodium hydrogen phosphate, and mixtures thereof.

20. The method of claim 16, wherein said complex has a molar ratio of less than about 3:1 phosphorus compound:titanium compound.

* * * * *